US012673472B2

(12) United States Patent
Duc et al.

(10) Patent No.: US 12,673,472 B2
(45) Date of Patent: Jul. 7, 2026

(54) METHOD FOR COATING LENSES WITH LENSLETS WITH AN IMPROVED CONTROL ON POWER SHIFT

(71) Applicant: Essilor International, Charenton-le-pont (FR)

(72) Inventors: Olivier Duc, Saint Loups Geanges (FR); Hélène Guillou, Noiseau (FR)

(73) Assignee: Essilor International, Charenton-le-Pont (FR)

( * ) Notice: Subject to any disclaimer, the term of this patent is extended or adjusted under 35 U.S.C. 154(b) by 304 days.

(21) Appl. No.: 18/289,411

(22) PCT Filed: May 3, 2022

(86) PCT No.: PCT/EP2022/061887
§ 371 (c)(1),
(2) Date: Nov. 3, 2023

(87) PCT Pub. No.: WO2022/233896
PCT Pub. Date: Nov. 10, 2022

(65) Prior Publication Data
US 2024/0239064 A1     Jul. 18, 2024

(30) Foreign Application Priority Data

May 7, 2021    (EP) ..................................... 21305597

(51) Int. Cl.
B05D 1/18          (2006.01)
B05D 3/00          (2006.01)
(Continued)

(52) U.S. Cl.
CPC .......... B29D 11/00865 (2013.01); B05D 1/18 (2013.01); B05D 3/007 (2013.01);
(Continued)

(58) Field of Classification Search
CPC .......... B05D 1/002; B05D 1/18; B05D 3/007; B05D 3/0406; B05D 3/0413;
(Continued)

(56) References Cited

U.S. PATENT DOCUMENTS

2002/0027300 A1*  3/2002  Hartmann ............. G03F 7/0002
                                                       264/306
2004/0096577 A1   5/2004  Trinh et al.
(Continued)

FOREIGN PATENT DOCUMENTS

CN          105022105        11/2015
EP            3640712 A1 *   4/2020   ............. G02C 7/022
(Continued)

OTHER PUBLICATIONS

International Search Report and Written Opinion issued in corresponding PCT Application No. PCT/EP2022/061887, mailed Sep. 26, 2022.

*Primary Examiner* — William P Fletcher, III
(74) *Attorney, Agent, or Firm* — Norton Rose Fulbright US LLP

(57) ABSTRACT

The disclosure relates to a method for coating an optical lens having a main surface at least partly covered with lenslets. The optical lens is dipped in a coating fluid, withdrawn to reach an initial position defined so that said main surface faces towards a first, horizontal, direction, and the coating fluid coating said optical lens is dried. After withdrawing the optical lens and before or while drying the coating fluid, the optical lens is tilted to a final position defined so that said main surface faces upwards towards a final direction having an angle comprised between 80° and 100° with respect to the first direction, the first and final directions defining a vertical plane. Alternately or in combination, while withdrawing said optical lens, part of the coating fluid is removed from the
(Continued)

optical lens by sliding said optical lens along a mechanical blade.

8 Claims, 5 Drawing Sheets

(51) Int. Cl.

| | |
|---|---|
| *B05D 3/04* | (2006.01) |
| *B05D 3/12* | (2006.01) |
| *B29D 11/00* | (2006.01) |
| *B29L 11/00* | (2006.01) |

(52) U.S. Cl.
CPC ............. *B05D 3/0406* (2013.01); *B05D 3/12* (2013.01); *B29L 2011/0016* (2013.01)

(58) Field of Classification Search
CPC .... B05D 3/0473; B05D 3/12; B05D 2201/02; B29D 11/00326; B29D 11/00355; B29D 11/00442; B29D 11/00865; B29L 2011/0016; G02C 7/022; G02C 2202/24
See application file for complete search history.

(56) References Cited

U.S. PATENT DOCUMENTS

| | | | |
|---|---|---|---|
| 2009/0026640 A1 | 1/2009 | Wymouth, Jr. et al. | |
| 2013/0022739 A1* | 1/2013 | Biteau ............. | B29D 11/00009 427/162 |
| 2015/0198746 A1* | 7/2015 | Watanabe ................ | G02C 7/02 427/164 |
| 2015/0219802 A1* | 8/2015 | Watanabe ........ | B29D 11/00009 427/162 |
| 2015/0277146 A1 | 10/2015 | Vázquez et al. | |
| 2017/0131567 A1 | 5/2017 | To et al. | |

FOREIGN PATENT DOCUMENTS

| | | | | |
|---|---|---|---|---|
| EP | 3640712 | 8/2022 | | |
| JP | S63-106951 | 5/1988 | | |
| JP | H08-207171 | 8/1996 | | |
| JP | H09-155983 | 6/1997 | | |
| JP | 2001 305302 | 10/2001 | | |
| JP | 2004 202463 | 7/2004 | | |
| JP | 2005-043572 | 2/2005 | | |
| JP | 2008-191592 | 8/2008 | | |
| JP | 2011-137975 | 7/2011 | | |
| JP | 2012 030185 | 2/2012 | | |
| JP | 2012030185 A | * 2/2012 | | |
| JP | 2012118167 A | * 6/2012 | | |
| JP | 2012-181251 | 9/2012 | | |
| JP | 2013-054096 | 3/2013 | | |
| JP | 2013-190712 | 9/2013 | | |
| JP | 2013-246347 | 12/2013 | | |
| JP | 2014 044351 | 3/2014 | | |
| JP | 2014044351 A | * 3/2014 | ....... | B29D 11/00009 |
| JP | 2015-118849 | 6/2015 | | |
| JP | 2021-105692 | 7/2021 | | |
| WO | WO2018/168414 | 9/2018 | | |
| WO | WO2020/079105 | 4/2020 | | |

* cited by examiner

METHOD FOR COATING LENSES WITH LENSLETS WITH AN IMPROVED CONTROL ON POWER SHIFT

CROSS-REFERENCE TO RELATED APPLICATIONS

This application is a national phase application under 35 U.S.C. § 371 of International Application No. PCT/EP2022/061887 filed 3 May 2022, which claims priority to European Patent Application No. 21305597.3 filed 7 May 2021. The entire contents of each of the above-referenced disclosures is specifically incorporated by reference herein without disclaimer.

FIELD OF THE INVENTION

The disclosure belongs to the field of ophthalmic optics. It generally relates to the coating of optical lenses.

In particular there are disclosed methods for coating an optical lens having a main surface at least partly covered with lenslets and a corresponding computer program, storage medium and processing circuit.

BACKGROUND OF THE INVENTION

In the ophthalmic industry, it has been known for decades to apply a surface treatment to optical lenses.

For example, some lens prescriptions need a sunscreen function for eye protection. Tinting is the most common way to convert a clear lens into a sunscreen lens. Depending on the material the lens is formed of, it is not always possible to dye an optical lens in the mass. For example, polycarbonate does not easily absorb dye molecules. Polycarbonate-based optical lenses therefore rely on a tintable hard coating, which readily absorbs dye molecules, for its tintability.

To coat an optical lens with a hard coating, the most common methods are dip-coating and spin-coating.

A known reoccurring issue with dip-coating methods is controlling the thickness of the resulting hard coating.

For a number of applications, it has been found desirable to provide on the base-lens substrate a plurality of lenslets, such as microlenses, providing a local change of the power of the optical article. For instance, it is known from US 2017/0131567 a lens comprising a plurality of microlenses formed on a surface of the lens, the local change of power provided by the microlenses enabling to suppress or slow down the progress of myopia In this regard, coating a substrate comprising lenslets on at least one of its surfaces impacts the resulting optical power at the lenslets. This impact may be compensated by adjusting the optical power of the lenslets beforehand, when manufacturing the substrate. But such adjustment may only be calculated for compensating the impact of a specific expected thickness of the hard coating.

As a consequence, if the impact of the hard coating on the optical power at the lenslets is to be compensated by uniformly adjusting the optical power of the lenslets, then it is further necessary to assume that the thickness of the hard coating is perfectly uniform all over the optical lens.

Further, if the thickness of the hard coating is non uniform over a given spherical lenslet, then asphericity is introduced by the hard coating and such lenslet appears deformed to the wearer.

In this context, there is a need to tighten the tolerance on the thickness of the coating layer. This may allow minimizing any deformation of lenslets resulting from thickness inhomogeneity of the coating layer. As a result, sphericity or asphericity of optical lenses comprising lenslets on at least one of their main surfaces may be better controlled. This may enhance the production reliability and the efficiency of all final products

SUMMARY OF THE INVENTION

The invention is defined by the appended independent claims. Additional features and advantages of the concepts herein disclosed are set forth in the description which follows.

The present disclosure aims at improving the situation. To this end, the present disclosure describes a method for coating an optical lens having a main surface at least partly covered with lenslets, the method comprising:

dipping said optical lens in a coating fluid, withdrawing said optical lens from the coating fluid to reach an initial position defined so that said main surface faces towards a first, horizontal, direction, and drying the coating fluid coating said optical lens, wherein the method comprises, after withdrawing the optical lens and before or while drying the coating fluid, tilting the optical lens to a final position defined so that said main surface faces upwards towards a final direction having an angle comprised between 80° and 100° with respect to the first direction, the first and final directions defining a vertical plane.

In the initial position, that is vertically, the fluid tends to flow, under the effect of gravity, towards the lower edge of the optical lens. Considering the lenslets as complex structures, the same effect applies at the scale of the lenslets, so that the amount of fluid tends to be greater, thus to have an excess thickness, at the lower edge of the lenslets.

By tilting the optical lens, the fluid tends to better spread across the main surface of the optical lens onto which the lenslets are arranged. Considering specifically a given lenslet onto a main surface of the optical lens, the fluid tends to have a more homogenous thickness over the surface of said lenslet when the optical lens lies in the final position, that is substantially horizontally.

Therefore, tilting the fluid coated optical lens with lenslets to a substantially horizontal final position, then drying the coating fluid while in such final position provides an optical lens with lenslets, which hard coating has a more homogenous thickness than is known in the prior art.

In an example, tilting the optical lens to the final position comprises:

tilting the optical lens from the initial position to an intermediate position defined so that said main surface faces upwards towards a second direction within said vertical plane, the second direction having an angle comprised between 105° and 125° with respect to the first direction, then tilting the optical lens from the intermediate position to the final position.

Considering that in the initial position, the coating fluid flows in a given direction that is oriented downwards, then in the intermediate position, the coating fluid is allowed to backflow in the opposite direction. Such an intermediate position is particularly interesting to force a relatively viscous coating fluid to spread evenly across a main surface of the optical lens and more particularly across the surface of each particular lenslet prior to drying.

As a result of this uniform spread, the appearance of the lenslets and the resulting optical function of the optical lens is uniformly affected by the presence of the hard coating.

The impact of a hard coating having a homogenous thickness may be more easily compensated than that of a hard coating having an inhomogeneous thickness.

In an example, withdrawing the optical lens from the coating fluid is conducted at a constant withdrawal speed.

In an example, withdrawing the optical lens from the coating fluid is conducted at a progressively decreasing withdrawal speed.

Withdrawal speed is an example of an adjustable parameter having an influence on the homogeneity of the coating layer. Opting for a specific constant withdrawal speed or for a specific deceleration of the withdrawal speed is a choice depending on the physical properties of the coating fluid, particularly in terms of viscosity and surface tension, and of its interaction, in terms of physical adhesion, to the substrate.

In an example, the method comprises, after withdrawing and before tilting the optical lens, waiting a predetermined amount of time equal to at most 3 seconds to allow part of the coating fluid coating the optical lens to drip.

By letting part of the coating fluid to drip, the total amount of coating fluid remaining on the optical lens decreases, leading to a thinner hard coating layer after drying.

In an example, tilting the optical lens is conducted according to a smooth continuous movement.

A smooth continuous movement allows the coating fluid to progressively stop flowing towards the portion of the optical lens located at the lower edge in the initial position and then to retreat and spread evenly over the main surface covered with lenslets.

In an example, drying the coating fluid coating the optical lens comprises controlling a temperature at the main surface of the optical lens.

Typically, a single temperature plateau, or a series of increasing temperature plateaus, may be chosen to evaporate the solvent at a specific rate so as to dry the hard coating layer in a predetermined amount of time.

In an example, drying the coating fluid coating the optical lens comprises controlling a gas flow rate at the main surface of the optical lens.

Establishing gas flow allows evacuating evaporated solvent. Therefore, the gas remains far from being saturated and evaporation of the solvent may continue until a dry hard coating is formed.

In another aspect, it is proposed a method for coating an optical lens having a main surface at least partly covered with lenslets, the method comprising:

dipping said optical lens in a coating fluid, withdrawing said optical lens from the coating fluid to reach an initial position defined so that said main surface faces towards a first, horizontal, direction, and drying the coating fluid coating said optical lens, wherein the method comprises, while withdrawing said optical lens, removing part of the coating fluid from the optical lens by sliding said optical lens along a mechanical blade.

The mechanical blade allows removing an excess amount of coating fluid that would otherwise accumulate at the bottom of the optical lens and cause, after drying, a local excess thickness of the coating layer.

In an example, the method comprises, after withdrawing the optical lens and before or while drying the coating fluid, tilting the optical lens to a final position defined so that said main surface faces upwards towards a final direction having an angle comprised between 80° and 100° with respect to the first direction, the first and final directions defining a vertical plane.

This actually corresponds to combining both proposed aspects to provide a compound advantage on achieving an optical lens, comprising lenslets on at least one of its main surfaces, and covered with a hard coating which thickness is particularly homogenous across the whole surface of the optical lens as well as across the surface of each particular lenslet.

Embodiments of the invention further provide a computer program comprising one or more stored sequences of instructions that are accessible to a processing unit and which, when executed by the processing unit, cause the processing unit to carry out at least part of the proposed method.

Embodiments of the invention further provide a storage medium storing one or more stored sequences of instructions of the above computer program.

Embodiments of the invention further provide a processing circuit comprising a processing unit connected to a memory and to a communication interface with at least one or more motors, the processing circuit being configured to implement the above method by at least instructing the one or more motors to control a position and/or an orientation of an optical lens having a main surface at least partly covered with lenslets.

The methods, computer program, storage medium and processing circuit above allow homogenizing the coating layer coating a main surface of an optical lens, said main surface being at least partly covered with lenslets.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

FIGS. 7A, 7B and 7C depict respectively a side view, a front view and a close-up front view of a straight mechanical blade, according to an exemplary embodiment.

DETAILED DESCRIPTION OF THE INVENTION

Figure 1:
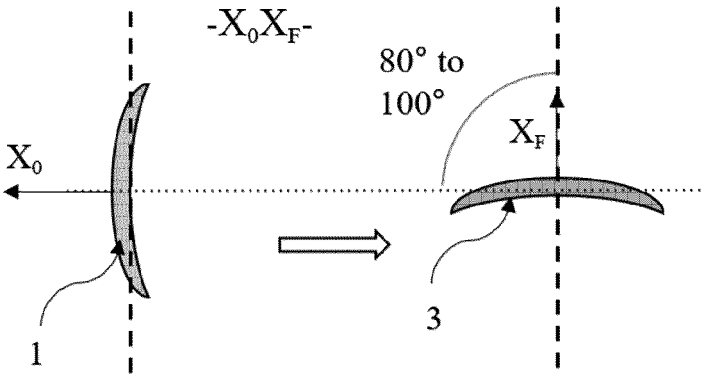
FIG. 1 illustrates a single-step tilting of an optical lens, according to an exemplary embodiment.

The present disclosure describes alternate approaches solving the same problem of controlling the homogeneity of the thickness of a hard coating of an optical lens, preferably an ophthalmic lens, having a main surface at least partly covered with lenslets. These approaches may of course be combined.

The end result is an optical lens which hard coating has a uniform impact, or power shift, on the optical function of the lenslets. Such impact may easily be compensated upstream, when manufacturing the lenslets, by uniformly offsetting the optical function of the lenslets accordingly.

The structural aspects of the optical lens are described thereafter. The optical lens comprises lenslets that may be arranged on the convex front side (also called object-side) or on the concave rear side (also called eyeball-side) main surface of the optical lens, or on both main surfaces.

Lenslets may form bumps and/or recesses at the main surface they are arranged onto. The outline of the lenslets may be round or polygonal, for example hexagonal.

More particularly, in what follows, a lenslet is a discrete optical element inducing a local change in optical power of the optical device.

More particularly, lenslets may be microlenses. A microlens may be spherical, toric, or have an aspherical shape, rotationally symmetrical or not. A microlens may have a single focus point, or cylindrical power, or non-focusing point. In preferred embodiments, lenslets or microlenses can be used to prevent progression of myopia or hyperopia. In that case, the base lens substrate comprises a base lens providing an optical power for correcting myopia or hyperopia, and the lenslets or the microlenses may provide respectively an optical power greater than the optical power of the base lens if the wearer has myopia, or an optical power lower than the optical power of the base lens if the wearer has hyperopia.

Lenslets or microlenses may also be Fresnel structures, diffractive structures such as microlenses defining each a Fresnel structure, permanent technical bumps or phase-shifting elements. It can also be a refractive optical element such as microprisms and a light-diffusing optical element such as small protuberances or cavities, or any type of element generating roughness on the substrate.

Lenslets or microlenses can also be IT-Fresnel lenslets as described in US2021109379 A1, i.e. Fresnel lenslets which phase function has $\pi$ phase jumps at the nominal wavelength, as opposition to unifocal Fresnel lenses which phase jumps are multiple values of 21. Such lenslets include structures that have a discontinuous shape. In other words, the shape of such structures may be described by an altitude function, in terms of distance from the base level of the main surface of the optical lens the lenslet belongs to, which exhibits a discontinuity, or which derivative exhibits a discontinuity.

The lenslets of the present invention may have a contour shape being inscribable in a circle having a diameter greater than or equal to 0.5 micrometers ($\mu$m) and smaller than or equal to 1.5 millimeters (mm).

The lenslets of the present invention have a maximum height, measured in a direction perpendicular to the main surface they are arranged onto, that is greater than or equal to 0.1 $\mu$m and less than or equal to 50 $\mu$m. Said main surface can be defined as a surface, that can be a plano, spherical, sphero cylindrical or even complex surface, that includes the central point of every microstructures. This main surface can be a virtual surface, when microstructures are embedded in the lens or close or identical to the ophthalmic lens physical outer surfaces when microstructures are not embedded. The height of the microstructure can be then determined using local perpendicular axis to this main surface, and calculating for the each point of the microstructure the difference between the maximum positive deviation minus the minimum negative deviation to the main surface, along the axis.

Lenslets may have periodical or pseudo periodical layout, but may also have randomized positions. Exemplary layouts for lenslets may be a grid with constant grid step, honeycomb layout, multiple concentric rings, contiguous e.g. no space in between microstructures.

These structures may provide optical wave front modification in intensity, curvature, or light deviation, where the intensity of wave front is configured such that structures may be absorptive and may locally absorb wave front intensity with a range from 0% to 100%, where the curvature is configured such that the structure may locally modify wave front curvature with a range of +/−20 Diopters, and light deviation is configured such that the structure may locally scatter light with angle ranging from +/−1° to +/−30°.

A distance between structures may range from 0 (contiguous) to 3 times the structure (separate microstructures).

Nowadays, optical lenses may be provided with various types of additional functions, generally through use of hard coatings. Hard coatings are generally superior to the formerly used soft coatings, made of stacked layers of films consisting for example of silver, zinc sulfide, cryolite and the like. Indeed, hard coatings are robust, their edges are less susceptible to degrade than soft coatings when exposed to moisture and through typical use, their transmission of wavelengths is vastly superior as compared to soft coating and remains constant over time and through use.

To apply a hard coating on an optical lens, dip-coating techniques may be used. Dip-coating an optical lens first involves dipping the optical lens in a tank filled with a fluid. Such fluid, an example of which is varnish, is a solution of the coating material in a volatile solvent. If the coating is to be applied only on one of the main surfaces, or on part of such surface, it is possible for example to cover the remainder of the optical lens with a film that is to be peeled off afterwards. After being dipped, the optical lens is withdrawn from the tank and left to dry. Through evaporation of the solvent, the coating material forms a hard layer covering the optical lens. Such evaporation may be accelerated through use of a gas flow and through control of ambient pressure and of ambient temperature.

It is critical to make sure that a specific amount of coating material is applied on the optical lens and that said amount of coating material is spread to form a layer having a generally even thickness. Especially, the layer shall have an even thickness over the surface of any given lenslet. To do so, various parameters are controllable at every stage.

For example, the composition of the coating fluid has an influence on its physical properties, in particular viscosity and surface tension which both affect how well the coating fluid is retained by a complex surface prior to drying. Therefore, the composition of the coating fluid, in terms of nature of the solvent and of the solute, and in terms of concentration of the solute, is an example of a controllable parameter. In the context of this document, the coating fluid is always assumed to have a composition that is suitable for coating an optical lens comprising lenslets on one or both of its main surfaces.

For example, the speed at which the optical lens is withdrawn from the tank, and the variations thereof, has an influence on how the coating is retained onto the surface of the optical lens. Therefore, an example of a controllable parameter is whether to withdraw the optical lens from the tank at a constant speed or, on the contrary, at a progressively decreasing speed which is more favorable to achieving thickness uniformity of the hard coating.

An issue occurring when the optical lens is dipped in a fluid tank then fully withdrawn from the tank is that due to gravity, the fluid coating the optical lens tends to flow downwards and accumulate at the lower edge. This is true at the full scale of the optical lens, but also at the smaller scale of a single lenslet, so that a meniscus forms at the lower edge of every single lenslet.

The formation of a meniscus at a lower edge translates into a local excess thickness after the fluid dries. In other words, the coating layer exhibits thickness gradients and has a non-uniform impact on the optical power at the lenslets.

In order to prevent, or at least reduce, such thickness variations, it is proposed, in an embodiment, to tilt the withdrawn, fluid-coated optical lens before and/or while drying the coating fluid.

It is now referred to FIG. 1, which illustrates an exemplary single-step tilting of such optical lens.

Upon fully withdrawing the optical lens from the fluid tank, the optical lens is held vertically in an initial position (1). A possible definition of the initial position (1) is that in such position, the outline of each main surface is within a corresponding vertical plane. A possible alternate definition, considering for example that the lenslets are arranged onto the front main surface, is that in the initial position (1), the normal line to the front main surface at the geometrical center of the front main surface faces towards an initial direction Xo that is horizontal.

It is possible to define standard basis vectors (X, Y, Z) that are orthogonal to one another, with X pointing towards a first direction corresponding to the initial direction Xo, Y pointing towards a second horizontal direction and Z pointing towards a third, vertical direction. In such case, when the optical lens is in the initial position (1), the outlines of the main surfaces are each in a corresponding parallel plane that may be defined by a point belonging to said outline and by vectors Y and Z.

From the initial position (1), the optical lens is tilted until reaching a final position (3) in which the optical lens lies horizontally. In FIG. 1, the tilting is done in a single step and is a rotation of the optical lens from the initial position (1) to the final position (3), the rotation being by an angle comprised between 80° and 100° around an axis directed by vector Y.

It is for example considered a tilt by a 90° angle from the initial position (1) to the final position (3). In such case, in the final position (3), the outline of each main surface lies in a corresponding horizontal plane that may be defined by a point belonging to said outline and by vectors X and Y. The normal line to the front main surface at the geometrical center of the front main surface faces towards a final direction XF that is vertical, faces up and corresponds to vector Z.

By tilting the optical lens by a 80° to a 100° angle and reaching the final position (3), the layer of coating fluid coating the optical lens gets flattened: its thickness is more homogenous over the whole main surface onto which the lenslets are arranged. Any local excess thickness is also minimized.

Starting from the initial position (1), the optical lens may be tilted as described above either immediately or after a predetermined time, set for example to 3 seconds or less, to allow an excess amount of coating fluid to drip back into the tank. Such predetermined time is an example of a controllable parameter.

The tilting itself may be done with a specific speed, such tilting speed being another example of a controllable parameter. For example, the rotation movement may be done at a constant speed, within a predetermined time comprised between 3 and 10 seconds.

The drying may be performed for example in about 15 to 20 minutes by submitting the optical lens, while in the final position (3), to a predetermined temperature program, which may include one or more temperature plateaus. Throughout this process, the optical lens may be submitted to gas flow. The temperature program as well as the nature of the gas and the rate of flow are all further examples of controllable parameters, which may be adjusted to form an optimized set of parameters for a specific coating fluid and/or for achieving a specific target thickness of the coating layer.

Figure 2:
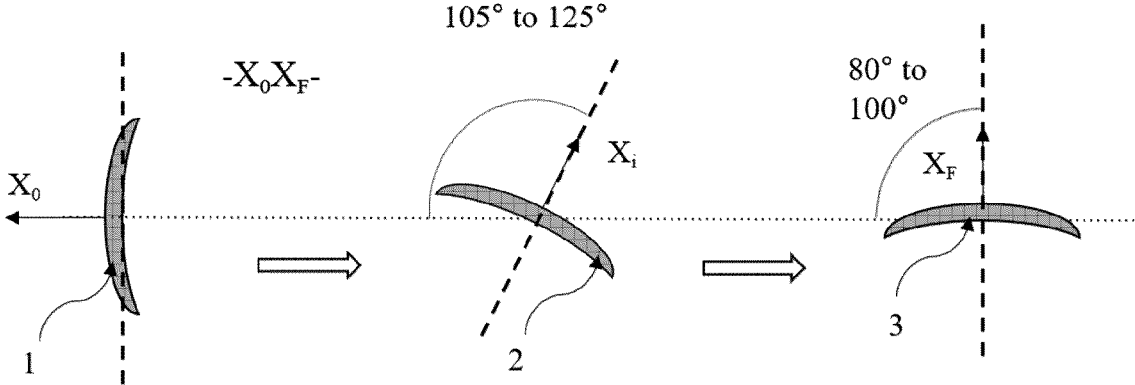
FIG. 2 depicts a double-step tilting of an optical lens, according to an exemplary embodiment.

It is now referred to FIG. 2, which depicts a double-step tilting of such optical lens.

In FIG. 2, the optical lens is tilted from the same initial position (1) to the same final position (3) as in FIG. 1, but the transition between both positions is not monotonous.

Rather, the optical lens first reaches an intermediate position (2) resulting of a rotation of the optical lens, around the axis directed by vector Y, which overshoots the target angular difference of 80° to 100° later reached at the final position (3) with respect to the initial position (1). Only then is the optical lens reverse tilted to reach the final position (3).

Instead, in the intermediate position (2), the normal line to the front main surface at the geometrical center of the front main surface faces towards an intermediate direction Xi, forming, with the initial direction Xo, an angle comprised between 105° and 125°.

The lower edge of the optical lens when in the initial position (1) becomes the upper edge when in such intermediate position (2). This allows the coating fluid to flow in the opposite direction to that before the tilting.

Therefore, by rotating the optical lens up to the intermediate position (2), any local excess thickness of the coating further retreats as opposed to rotating the optical lens only up to the final position (3). Compared to the single-step tilting described above, the double-step tilting therefore allows a better flattening of the coating layer in cases when the coating fluid can only flow slowly due to a high viscosity.

Figure 3:
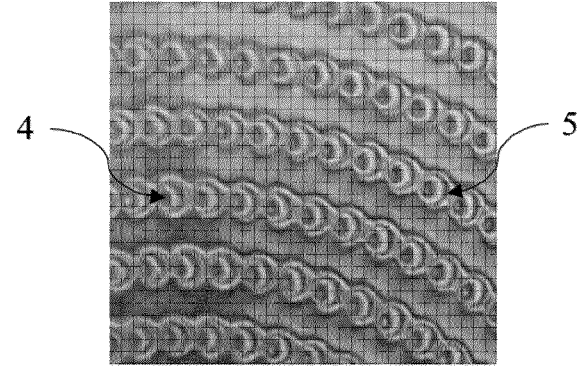
FIG. 3 depicts an appearance of an optical lens coated with a layer having an inhomogeneous thickness due to an unwanted flow of the coating while drying.

It is now referred to FIG. 3, which is a picture of a coated optical lens having spherical lenslets (4) having a circular outline, contiguously arranged on its convex surface in the form of concentric rings.

The optical lens of FIG. 3 has been dip-coated by being vertically dipped in a coating fluid tank, then vertically withdrawn and dried, still vertically, without having been tilted in the process.

FIG. 3 specifically pictures a portion of the convex surface of the coated optical lens lying horizontally. The left side of FIG. 3 corresponds to the upper side of the optical lens during the drying process. Conversely, the right side of FIG. 3 corresponds to the lower side of the optical lens during the drying process.

It can be seen that each lenslet comprises the same deformed, crescent-shaped, appearance which is detrimental to its optical properties. Indeed, after withdrawing the optical lens and while drying the coating fluid, a meniscus has systematically formed, due to flow of the coating fluid, at the lower end of each lenslet (4). The solidification of such meniscus leads to a local excess thickness of the hard coating coating the lenslet, in an area (5) the shape of a crescent.

Figure 4:
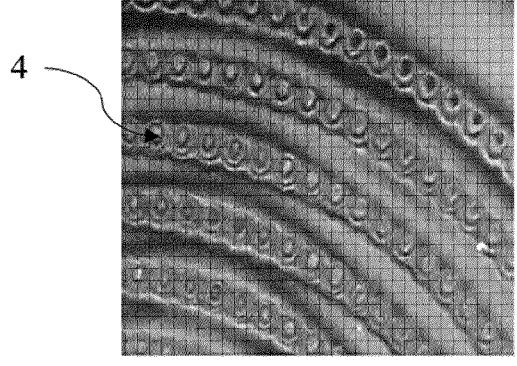
FIG. 4 depicts an appearance of an optical lens coated with a layer having a more homogenous thickness than that of the optical lens of FIG. 3, according to an exemplary embodiment.

It is now referred to FIG. 4, which is a picture of another coated optical lens. Such lens differs from that depicted on FIG. 3 only in that the optical lens has been withdrawn from the coating fluid filled tank to reach an initial position, then tilted towards a final position having a 80° to 100° angle with respect to the initial position and finally dried while held in the final position.

It can be seen on FIG. 4 that each lenslet (4) has a generally spherical appearance, devoid of the crescent-shaped areas of excess thickness seen on FIG. 3. Therefore, due to the tilting, the general appearance of the lenslets after coating the optical lens is preserved, i.e. matches the actual shape of the lenslets prior to coating. More importantly, the optical properties of the lenslets are uniformly affected by the hard coating, both at the scale of a single lenslet and from a lenslet to another, i.e. at the scale of the whole optical lens.

The method described above in connection with FIGS. 1 and 2 and leading to an optical lens as pictured on FIG. 4 may be performed manually by an operator, or be semi-automated, or even be fully automated. Semi automation is necessary for testing different values of various controllable parameters, then checking the quality of the resulting coated optical lenses, for example by capturing pictures such as the one depicted on FIG. 4, so as to finally approve a set of optimized values of the controllable parameters. Full automation is key for reliably allowing mass production of coated optical lenses having lenslets on at least one of its main surfaces and having a coating layer with a uniform thickness over the lenslets.

Typically, the optical lens may be held by a lens holder which may be translated and rotated by operating motors, for example stepper motors. The translation and rotation movements may either be directly controlled by an operator, in case of semi-automation, or pre-programmed, in case of full automation.

Figure 5:
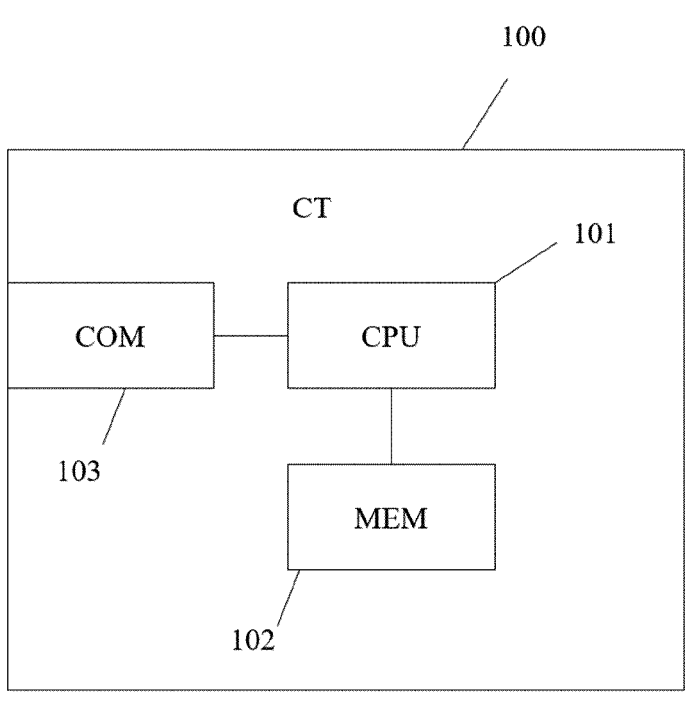
FIG. 5 depicts an exemplary processing circuit according to an exemplary embodiment.
Figure 6:
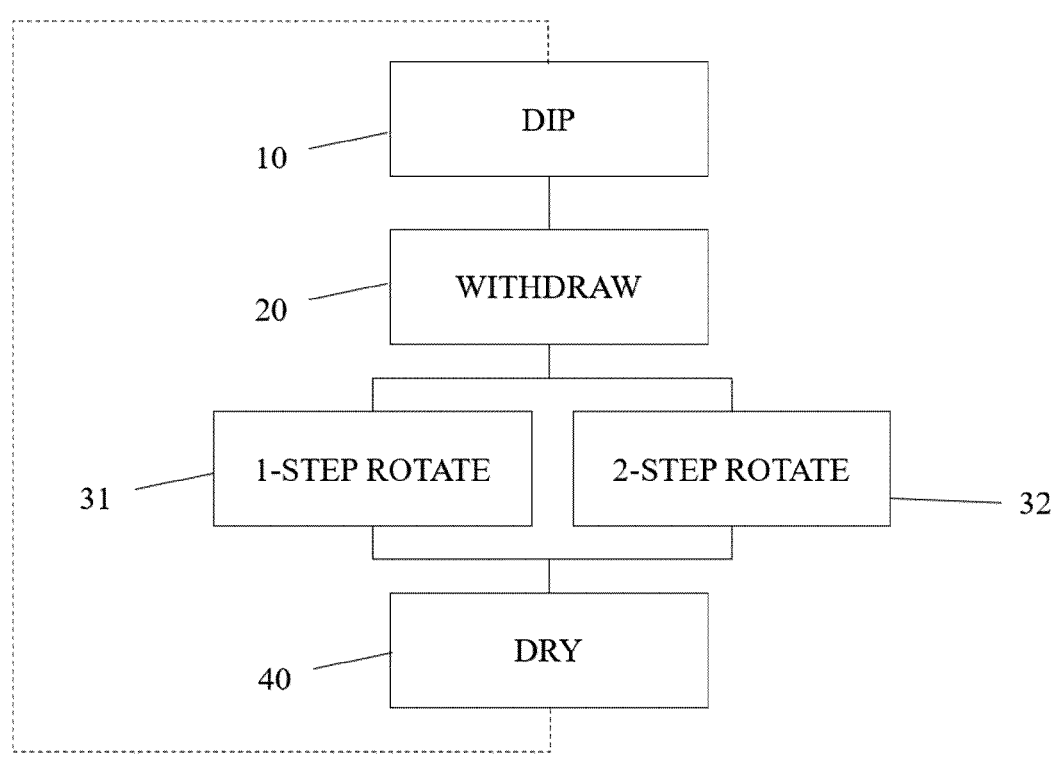
FIG. 6 depicts a flowchart of a computer-implemented method, according to an exemplary embodiment.

It is now referred to FIG. 5, which depicts an exemplary processing circuit and to FIG. 6, which depicts a general algorithm of a computer program comprising one or more instructions that may be run by such processing circuit, thus performing a method for coating an optical lens having a main surface at least partly covered with lenslets.

The processing circuit (100) depicted on FIG. 5 comprises a processing unit (101) operably coupled to a non-transitory memory (102) which may store the above computer program and to a communication interface (103) which allows, at least, operating motors for translating and/or rotating a lens holder holding an optical lens. The communication interface (103) may further allow receiving instructions originating from an interaction with a human-computer interface. The communication interface (103) may further allow operating a heat generator for controlling a temperature at the optical lens and/or a valve for controlling a gas flow rate at the optical lens. As explained above, temperature and gas flow rate may be controllable parameters for the purpose of optimizing the drying of a coated optical lens.

The processing unit operates one or more motors for translating the lens holder so as to dip (10) the held optical lens in a tank filled with a coating fluid.

Then, the processing unit operates one or more motors for translating the lens holder so as to withdraw (20) the held optical lens from the tank. Such translation movement may be defined by an initial speed and by an acceleration that are both controllable, or adjustable, parameters.

Optionally, an adjustable waiting time of at most three seconds may allow excess coating fluid to drip back from the optical lens into the tank.

Then, the processing unit operates one or more motors for rotating the lens holder so as to rotate the withdrawn optical lens. The rotation may be chosen between a single-step rotation (31) as depicted for example in FIG. 1 and a double-step rotation (32) as depicted for example in FIG. 2. The rotation speed and acceleration are adjustable parameters.

Finally, the optical lens is dried (40), following an adjustable temperature program and under an adjustable flow rate of a gas that may be for example air, or an inert gas such as argon when the coating is to be protected from oxidation.

As a result, the optical lens is covered with a dry hard coating layer having a uniform thickness over the lenslets.

The process may be then repeated on the same optical lens with the same coating fluid, possibly with different values of the adjustable parameters, in order to form a double-layer hard coating.

The process may also be repeated on the same optical lens with a different coating fluid, possibly with different values of the adjustable parameters, in order to form a multiple layer hard coating, which layers have a different composition and provide different properties.

It is further proposed to use a mechanical blade, also called a mechanical drop-breaking device, to homogenize a coating film on a main surface of an optical lens, such main surface comprising lenslets.

To do so, the optical lens is maintained such that there is a permanent contact between the bottom of the lens and a mechanical blade. The lenses so held are dip-coated then withdrawn at either a uniform or progressive withdrawal speed.

When the lens is withdrawn from the coating fluid, due to surface tension phenomenon (capillary force), the coating film gets 'pulled out' by the mechanical blade. As a result, the thickness of the coating layer and its impact on the apparent form and the optical power of the lenslets are homogenized.

In other words, when such a mechanical blade is arranged in permanent contact with the optical lens, the thickness of the coating layer is homogenized as a result of the mechanical blade passively removing excess coating fluid while actively withdrawing the optical lens from the coating fluid filled tank.

The thickness of the coating layer may be further homogenized by actively rotating the optical lens as depicted in FIG. 1 or in FIG. 2.

It is now referred to FIGS. 7A, 7B, 7C, 7D, 8A, 8B and 8C which depict different views of different types of mechanical blades (7), showed in contact with an optical lens (6) comprising lenslets on one of its main surfaces, when the optical lens (6) is being withdrawn from an coating fluid-filled tank.

Figure 7C:
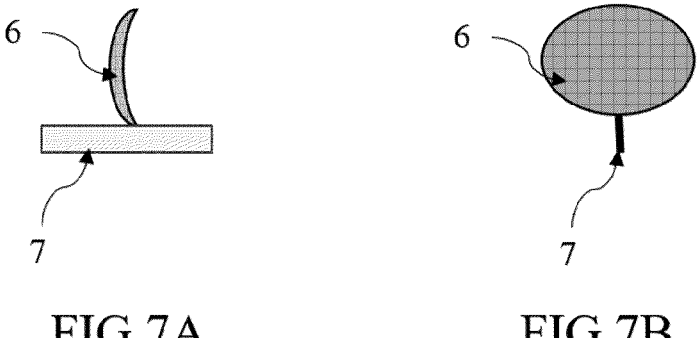
Figure 7C:
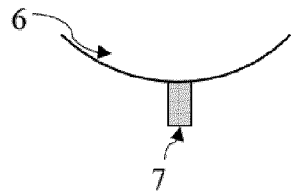
Figure 7D:
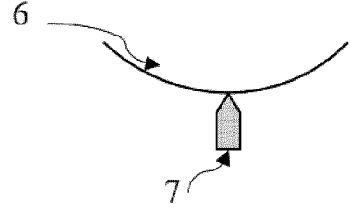
FIG. 7D depicts a close-up front view of another straight mechanical blade according to an exemplary embodiment.
Figures 8A, 8B, 8C:
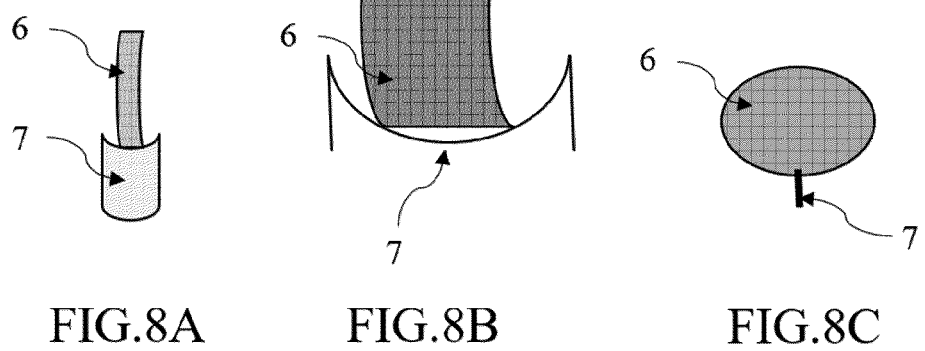
FIGS. 8A, 8B and 8C depict respectively a side view, a close-up side view and a front view of a curved mechanical blade, according to an exemplary embodiment.

Specifically, FIGS. 7A, 7B and 7C show different views of a straight mechanical blade without chamfer. FIG. 7D shows a straight mechanical blade with a chamfer. FIGS. 8A, 8B and 8C show different views of a curved mechanical blade, or of a curved portion of a crenellated mechanical blade.

The mechanical blade may be metallic or made from other materials that allow flowing of the coating fluid. The width of the blade is small, such as comprised between 0.5 mm and 2 mm, to avoid causing side defects such as marks on the optical lens (6). An additional chamfering, as showed on FIG. 7D, is possible to further lower the width of the blade (7) at the contact point with the optical lens (6).

The blade may be straight, as depicted in FIGS. 7A, 7B, 7C and 7D. It may on the contrary be curved as depicted in FIGS. 8A, 8B and 8C or crenellated, especially for lenses with a thick edge to ensure a better contact point between the blade (7) and the convex and the concave sides of the lens (6).

The invention claimed is:

1. A method for coating an optical lens having a main surface at least partly covered with lenslets, the method comprising:

dipping said optical lens in a coating fluid;

withdrawing said optical lens from the coating fluid to reach an initial position defined so that said main surface faces towards a first, horizontal, direction; and drying the coating fluid coating said optical lens;

wherein the method comprises, after withdrawing the optical lens and before or while drying the coating fluid, tilting the optical lens to a final position defined so that said main surface faces upwards towards a final direction having an angle comprised between 80° and 100° with respect to the first direction, the first and final directions defining a vertical plane.

2. The method according to claim 1, wherein tilting the optical lens to the final position comprises:

tilting the optical lens from the initial position to an intermediate position defined so that said main surface faces upwards towards a second direction within said vertical plane, the second direction having an angle comprised between 105° and 125° with respect to the first direction, then tilting the optical lens from the intermediate position to the final position.

3. The method according to claim 1, wherein withdrawing the optical lens from the coating fluid is conducted at a constant withdrawal speed.

4. The method according to claim 1, wherein withdrawing the optical lens from the coating fluid is conducted at a progressively decreasing withdrawal speed.

5. The method according to claim 1, wherein the method comprises, after withdrawing and before tilting the optical lens, waiting a predetermined amount of time equal to at most 3 seconds to allow part of the coating fluid coating the optical lens to drip.

6. The method according to claim 1, wherein tilting the optical lens is conducted according to a smooth continuous movement.

7. The method according to claim 1, wherein drying the coating fluid coating the optical lens comprises controlling a temperature at the main surface of the optical lens.

8. The method according to claim 1, wherein drying the coating fluid coating the optical lens comprises controlling a gas flow rate at the main surface of the optical lens.

* * * * *